United States Patent
Stonikas et al.

(10) Patent No.: US 7,428,447 B2
(45) Date of Patent: Sep. 23, 2008

(54) INVENTORY MANAGEMENT SYSTEMS

(75) Inventors: Robert Stonikas, Duluth, GA (US);
Daniel E. Weyen, Duluth, GA (US);
Ward P. Broom, Snellville, GA (US);
Robert M. Fitzgerald, Norcross, GA (US)

(73) Assignee: Innovative Product Achievements, Inc., Duluth, GA (US)

( * ) Notice: Subject to any disclaimer, the term of this patent is extended or adjusted under 35 U.S.C. 154(b) by 74 days.

(21) Appl. No.: 11/236,214

(22) Filed: Sep. 26, 2005

(65) Prior Publication Data

US 2007/0073441 A1 Mar. 29, 2007

(51) Int. Cl.
*G06F 17/00* (2006.01)
(52) U.S. Cl. ............... 700/244; 700/236; 700/240; 700/241
(58) Field of Classification Search ........... 700/240, 700/236
See application file for complete search history.

(56) References Cited

U.S. PATENT DOCUMENTS

| | | | |
|---|---|---|---|
| 3,455,621 A * | 7/1969 | Kingsley | 312/211 |
| 4,108,363 A | 8/1978 | Susumu | |
| 4,836,352 A | 6/1989 | Tateno et al. | |
| 5,091,713 A | 2/1992 | Horne et al. | |
| 5,207,784 A | 5/1993 | Schwartzendruber | |
| 5,313,393 A * | 5/1994 | Varley et al. | 705/28 |
| 5,488,202 A * | 1/1996 | Baitz et al. | 177/25.15 |
| RE35,743 E | 3/1998 | Pearson | |
| 5,805,456 A | 9/1998 | Higham et al. | |
| 5,905,653 A | 5/1999 | Higham et al. | |
| 6,269,285 B1 | 7/2001 | Mignault | |
| 6,330,856 B1 * | 12/2001 | Fitzgerald et al. | 100/52 |
| 6,457,038 B1 | 9/2002 | Defosse | |
| 6,502,012 B1 * | 12/2002 | Nelson | 700/236 |
| 6,694,221 B2 | 2/2004 | Chavez et al. | |
| 6,754,558 B2 | 6/2004 | Preston et al. | |
| 6,829,520 B1 | 12/2004 | Green | |
| 7,191,915 B2 | 3/2007 | Hair, III et al. | |
| 2002/0128957 A1 | 9/2002 | Rosenberg et al. | |
| 2003/0163221 A1 | 8/2003 | Hertz | |
| 2003/0220713 A1 | 11/2003 | Owens | |
| 2004/0206462 A1 * | 10/2004 | Ftizgerald et al. | 160/231.1 |
| 2004/0220697 A1 | 11/2004 | Chavez et al. | |
| 2005/0077352 A1 | 4/2005 | Gudbjartsson | |

* cited by examiner

*Primary Examiner*—Gene O. Crawford
*Assistant Examiner*—Timothy R Waggoner
(74) *Attorney, Agent, or Firm*—Alston & Bird LLP (57) ABSTRACT

An inventory management system for use, for example, in automatically distributing items (such as laundered items) to users within a particular facility (e.g., a hospital), and for monitoring the amount (e.g., weight) of items distributed by the system. The system may include, for example, at least one automated dispenser having a weighing mechanism (e.g., a scale) for measuring the weight of its inventory and for periodically transmitting this information to a computer system associated with a particular item processing facility (e.g., a laundry facility). The computer system may then use this information, for example, to predict the amount of incoming items (e.g., dirty laundry) to be processed by the item processing facility during an upcoming time period. The computer system may also use this information for other purposes, such as predicting the amount of items that will need to be loaded into the system's dispensers during an upcoming time period.

18 Claims, 9 Drawing Sheets

INVENTORY MANAGEMENT SYSTEMS

BACKGROUND OF THE INVENTION

In a hospital setting, laundered items (such as clean bedding materials and surgical scrubs) are typically used at the hospital, collected, and then picked up by a laundry service to be laundered outside of the hospital. The items are then returned, clean and folded, to the hospital for reuse.

One problem with this arrangement is the amount of laundry that any particular hospital uses can fluctuate dramatically from day to day. Accordingly, laundry services typically have no way of knowing how much laundry they will receive for processing on any given day. As a result, the laundry service must typically assume that it will receive a large amount of items for processing, and staff accordingly. This can result in wasted labor on days when the amount of items received from its client hospitals is relatively small. Alternatively, the laundry service may always assume that they will receive an average amount of items each day, and then arrange for overtime help on particularly busy days. This arrangement is also expensive and can be stressful to implement.

In addition, most laundry services typically bill hospitals and hospital departments based on the weight of the items received from the hospital or hospital department, which is measured after the items arrive at the laundry facility. Because the items are weighed in bulk, the hospital or hospital department is typically simply billed a weight-based charge for the processing of all items received from the hospital or department. This can create difficulties from a budgetary standpoint in the common situation where members of a particular hospital department retrieve items from a different department within the same hospital. In this situation, processing charges (e.g., laundry processing charges) are often charged to the incorrect department.

Accordingly, there is a need for improved item processing systems (especially laundry processing systems) that, for example, address the issues discussed above.

SUMMARY OF THE INVENTION

A dispenser according to a particular embodiment of the invention comprises: (1) a housing defining an interior portion; (2) a door that is positioned to move between: (a) a first door position, in which the door prevents access to the interior portion through an access opening; and (b) a second door position, in which the door does not prevent access to the interior portion through the access opening; (3) a weighing mechanism disposed substantially within (e.g., within) the interior portion; and (4) a storage cartridge that is adapted for supporting items to be dispensed from the dispenser through the access opening. In various embodiments, the storage cartridge being adapted for movement between: (1) a first storage cartridge position in which the storage cartridge is disposed substantially outside of the interior portion of the housing, and in which the storage cartridge is positioned out of weighing engagement with the weighing mechanism; and (2) a second storage cartridge position in which the storage cartridge is disposed substantially within the interior portion of the housing, and in which the storage cartridge is positioned in weighing engagement with the weighing mechanism.

An item distribution system according to various embodiments of the invention comprises: (1) an automated dispenser that is adapted for dispensing items from a storage cartridge that is adapted to be selectively rolled into and out of operable engagement with the automated dispenser; (2) an inventory server that is adapted to receive information from the dispenser via a communications network; and (3) a weighing mechanism positioned to measure a storage cartridge weight when the storage cartridge is in operable engagement with the dispenser—the storage cartridge weight comprising a weight of the storage cartridge and one or more items stored within the storage cartridge. In particular embodiments of the invention, the inventory server is adapted to receive the storage cartridge weight from the dispenser via the communications network.

An item distribution system according to various embodiments of the invention comprises: (1) a dispenser; (2) an inventory management computer system; and (3) a weighing mechanism positioned to measure a dispenser inventory weight comprising a weight of one or more items within the dispensed. In particular embodiments, the inventory management computer system is adapted to receive the dispenser inventory weight, and the inventory management computer system is configured for: (1) receiving the dispenser inventory weight; and (2) forecasting an amount of incoming items to be processed at an item processing facility based, at least in part, on the dispenser inventory weight.

An item distribution system according to a further embodiment of the invention comprises: (1) an inventory management computer system; (2) a dispenser that is connected to communicate with the inventory management computer system; and (3) one or more weighing mechanisms that are positioned to measure a weight of one or more items within the dispenser. In particular embodiments, the inventory management computer system is adapted to, for each particular one of a plurality of inventory dispensing transactions executed using the dispenser: (A) receive a first weight measurement taken by the one or more weighing mechanisms before a particular user removes inventory from the dispenser as part of the particular inventory dispensing transaction; (B) receive a second weight measurement taken by the one or more weighing mechanisms after the particular user removes inventory from the dispenser as part of the particular inventory dispensing transaction; (C) use the first and second weight measurements to determine a weight of items removed from the dispenser by the particular user during the particular inventory dispensing transaction; and (D) store, in memory, user history data, the user history data indicating that the weight of items determined in Step (C) was removed by the particular user during the particular transaction.

A method of monitoring the use of laundered items within a medical facility according to various embodiments of the invention comprises the steps of: (1) providing a plurality of laundered items within a dispenser; (2) providing a weight measuring device for use in determining the weight of laundered items removed from the dispenser; (3) for each particular one of a plurality of first user transactions conducted by a first user using the dispenser: (a) using the weight measuring device to determine a particular weight of laundered items removed from the dispenser by the first user during the course of the particular first user transaction; (b) storing, in memory, first user transaction data indicating that the first user removed the particular weight of items from the dispenser during the particular first user transaction. In various embodiments, the method further includes the step of: (4) for each particular one of a plurality of second user transactions conducted by a second user using the dispenser: (a) using the weight measuring device to determine a particular weight of laundered items removed from the dispenser by the second user during the course of the particular second user transaction; and (b) storing, in memory, second user transaction data indicating that the second user removed the particular weight of items from the dispenser during the particular second user transaction.

A method of forecasting the amount of a particular type of items to be received by an item processing facility during a first particular period of time, the method comprising: (1) providing one or more automated dispensers, each particular one of which is adapted for: (a) dispensing the particular type of items, and (b) for substantially automatically tracking an amount of the particular type of items dispensed from the particular dispenser; (2) receiving dispenser activity information from each particular one of the automated dispensers, the dispenser activity information indicating the amount the particular type of items dispensed by the particular dispenser within a second particular period of time; and (3) using the dispenser activity information to forecast the amount of the particular type of items to be received by an item processing facility during the first particular period of time.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF VARIOUS EMBODIMENTS OF THE INVENTION

The present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview of the Invention

Figure 1:
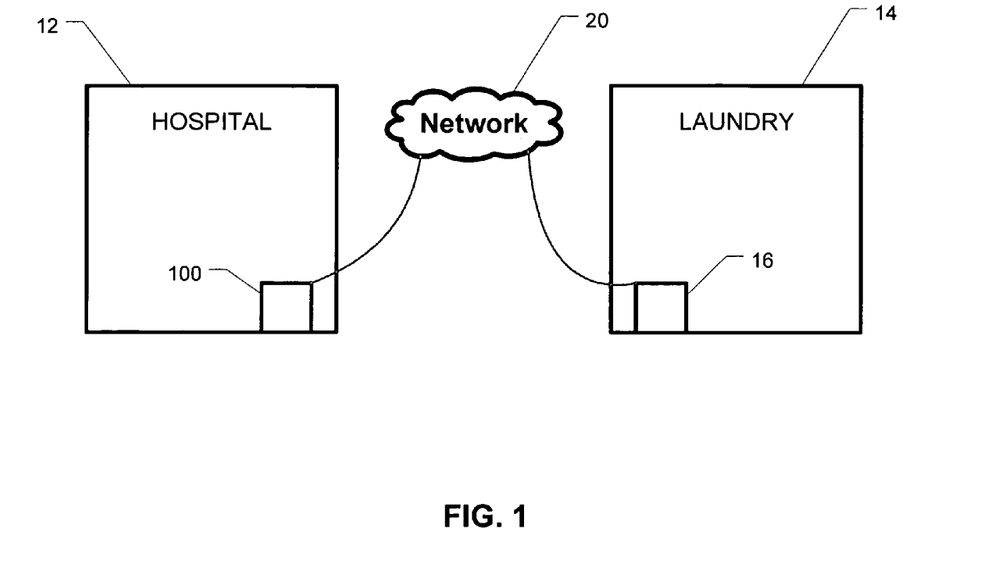
FIG. 1 is block diagram of an item management system according to a particular embodiment of the invention.

FIG. 1 provides a high-level overview of an item distribution system 5 according to a particular embodiment of the invention. As may be understood from this figure, in this embodiment, the item distribution system 5 includes a dispenser 100 that is disposed within a hospital 12. In addition, item distribution system 5 includes an inventory management system 16 (which may include an inventory management server 50) that is associated with (and optionally disposed within) a laundry facility 14. As shown in FIG. 1, the dispenser 100 and the inventory management system 16 are preferably connected to communicate via a network, such as a global communications network (e.g., the Internet).

In various embodiments of the invention, the dispenser 100 includes a weighing mechanism (e.g., a scale) that is adapted to weigh (e.g., on a continuous or substantially continuous basis) items to be dispensed from the dispenser 100, which may, for example, be laundered items. In preferred embodiments, the dispenser 100 is adapted to transmit the weight measured by the weighing mechanism (e.g., the weight of the dispenser's inventory), and/or the weight of items removed from the dispenser 100 during a particular transaction, to the inventory management system 16. The inventory management system 16 may then use this information to forecast the amount of items (e.g., dirty laundry) to be received from the hospital 12 during a subsequent time period (e.g., the next day). In particular embodiments of the invention, this amount of items may be measured by weight or quantity. In various embodiments of the invention, the inventory management system 16 bases this determination on the total weight of launderable items removed from one or more particular dispensers during a pre-determined time period (e.g., from 8:00 am-8:00 pm on a particular day).

In a particular embodiment of the invention, the inventory management system 16 is adapted to generate (e.g., automatically or substantially automatically) a staffing schedule based on the calculated forecast of dirty laundry volume. For example, the inventory management system 16 may be configured for estimating the number of laundry workers that would be needed to process the amount of dirty laundry that was forecasted to be received on a particular day and, optionally, identifying a shift of workers to work on the particular day. In one embodiment, the number of workers within this shift is equal to the calculated number of laundry workers. As an example, if the system calculated, based on the weight of items dispensed from a particular dispenser on a particular day, that 10 workers would be needed to process incoming dirty laundry on the next day, the inventory management system 16 might identify 10 particular workers who are available to work the next day and schedule those workers to work the next day. Alternatively, a separate system may be used to prepare a staffing schedule based on the forecast of dirty laundry volume generated by the inventory management system 16.

In further embodiments of the invention, the system uses additional information received from one or more hospitals (e.g., via the dispenser or suitable, separate, computer system associated with a particular hospital) to forecast the amount of dirty laundry to be received during a particular time period. One example of such additional information includes a hospital's census (or predicted census) for one or more days (e.g., the current day). In various embodiments of the invention, the system bases the forecasted amount of dirty laundry on both this additional information and the weight information referenced above. In other embodiments, the system may base this forecast solely on information other than this weight information.

In a particular embodiment of the invention, the inventory management system 16 uses weight measurements from the item management system's various dispensers 100 to determine the weight of items that have been removed during one or more particular time periods. In various embodiments of the invention, the inventory management system 16 uses this calculated total weight of removed items in combination with census information for one or more current or past days (e.g., the day immediately before the current day) to forecast the amount of items (e.g., dirty laundry) to be received by an item processing facility (e.g., a laundry processing facility) during a particular upcoming time period (e.g., the day following the current day).

In a further embodiment of the invention, the inventory management system 16 (or other system) uses weight measurements from the item management system's various dispensers 100 to keep track of the amount of items that remain in one or more (and preferably each of) the item distribution system's dispensers 100. The inventory management system 16 (or other system) may use this information to forecast how many items will need to be loaded into the various dispensers 100 in an upcoming period of time in order to satisfy projected user needs. In particular embodiments of the invention, the inventory management system 16 (or other system) is adapted to forecast an amount of items (e.g., an amount of clean laundry) that will need to be loaded into the item management system's various dispensers to satisfy a predicted need for these items. In various embodiments, this determination is based, at least in part, on each of the following types of information: (1) information regarding the current weight of inventory within at least one (and preferably each) dispenser 100 within the item management system 5; and (2) hospital census information for one or more particular days (e.g., census information for the respective medical facilities in which the various dispensers 100 are disposed, for the current day or one or more upcoming days).

In addition, in various embodiments of the invention, the item management system 5 includes one or more computers that are disposed within or adjacent a particular medical facility, and that are adapted to receive the weight of the current inventory of items disposed within one or more (and preferably each) dispenser 100 within the particular medical facility. Hospital personnel may use this information to monitor the amount of laundry or other items that are disposed within the dispensers 100 (e.g., for inventory restocking purposes). In one embodiment of the invention, the item management system 5 is adapted to automatically generate an alert (e.g., to hospital personnel) in response to determining that one or more of the system's dispensers 100 is running low on inventory (e.g., and therefore needs to be restocked with items).

In further embodiments of the invention, the inventory management system 16 is adapted to receive, for each particular dispensing transaction completed by at least one (and preferably each) dispenser associated with the inventory management system 16, weight data that indicates, or that may be used to calculate, the weight of items removed from the dispenser during that particular dispensing transaction. In addition, the inventory management system 16 is preferably configured to receive user identification information for each transaction that indicates, or that may be used to determine, the identity of the user that removed items from the particular dispenser during the particular transaction. In various embodiments of the invention, the inventory management system 16 is adapted to store this transaction specific removed-weight and user-identification information in memory (e.g., in a database) and to maintain this information in memory for an extended period of time (e.g., at least a week).

In particular embodiments of the invention, the inventory management system 16 is further configured for using the removed-weight and user-identification information discussed above to generate a report of the various users' dispenser use activities over an extended period of time (e.g., over a series of days, weeks, and/or months). This information may be used to determine whether a particular user is misusing items removed from the dispenser (e.g., whether the user is removing more launderable items, such as sheets, from the dispenser than would actually be required if the user were following proper hospital procedures).

In various embodiments of the invention, the inventory management system 16 may be configured to automatically identify users that may potentially be misusing items retrieved from the various dispensers associated with the inventory management system 16. In one embodiment, the inventory management system 16 does this by calculating an average weight of linens removed by one or more (and preferably all) users within a particular class of users (e.g., nurses) over a particular period of time (e.g., one month). The system then compares: (1) the weight of items retrieved from each of these particular users over the particular period of time, with (2) the calculated average weight of items retrieved over the particular period of time. In various embodiments, if the inventory management system 16 determines that the weight of items removed by a particular user differs by more than pre-determined amount (e.g., about 15% or 20%) from the average weight of items removed by users in the particular user's class of users, the system generates an alert. In one embodiment, the alert is a electronic text message that the inventory management system 16 sends automatically to the user's supervisor.

Figure 2:
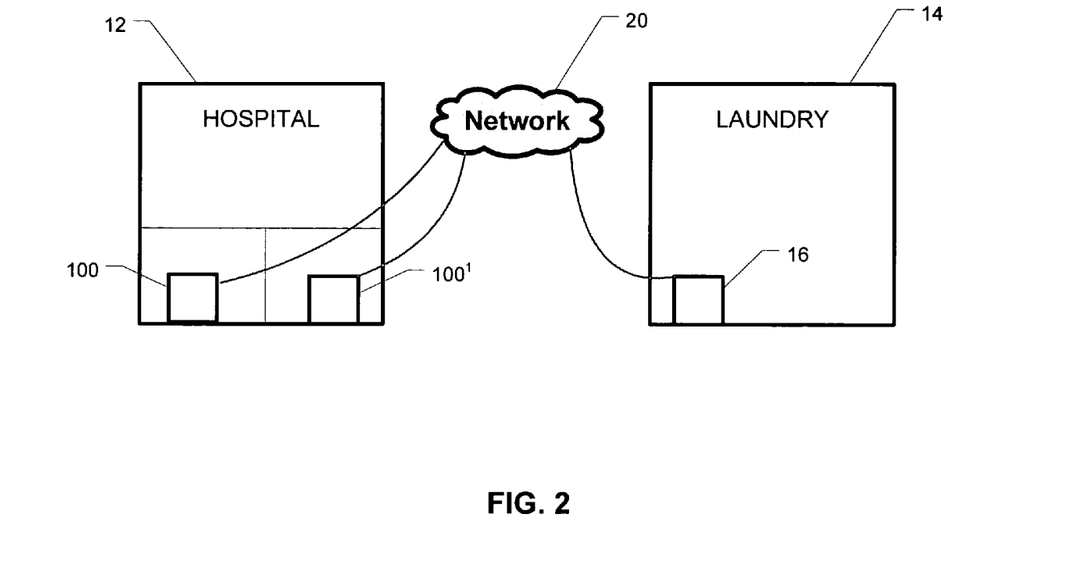
FIG. 2 is block diagram of an item management system according to a further embodiment of the invention.

As may be understood from FIG. 2, the item management system may include a plurality of dispensers 100 that are disposed within a particular hospital. For example, in the embodiment shown in FIG. 2, a first dispenser 100 is located in a first department of a particular hospital, and a second dispenser 100$^1$ is located in a second department in the hospital. In this embodiment, both the first and the second dispenser 100, 100$^1$ are connected to communicate with the inventory management system 16 via a communications network 20 such as the Internet. In a preferred embodiment of the invention, the first and the second dispenser 100, 100$^1$ each include a scale for measuring the weight of their respective inventories, and are adapted for transmitting weight data obtained from their respective scales to the inventory management system 16. This information is then used in the manner described above to forecast the volume of dirty laundry to be received by a laundry service from the hospital 12 during a subsequent time period (e.g., on the next day).

Figure 3:
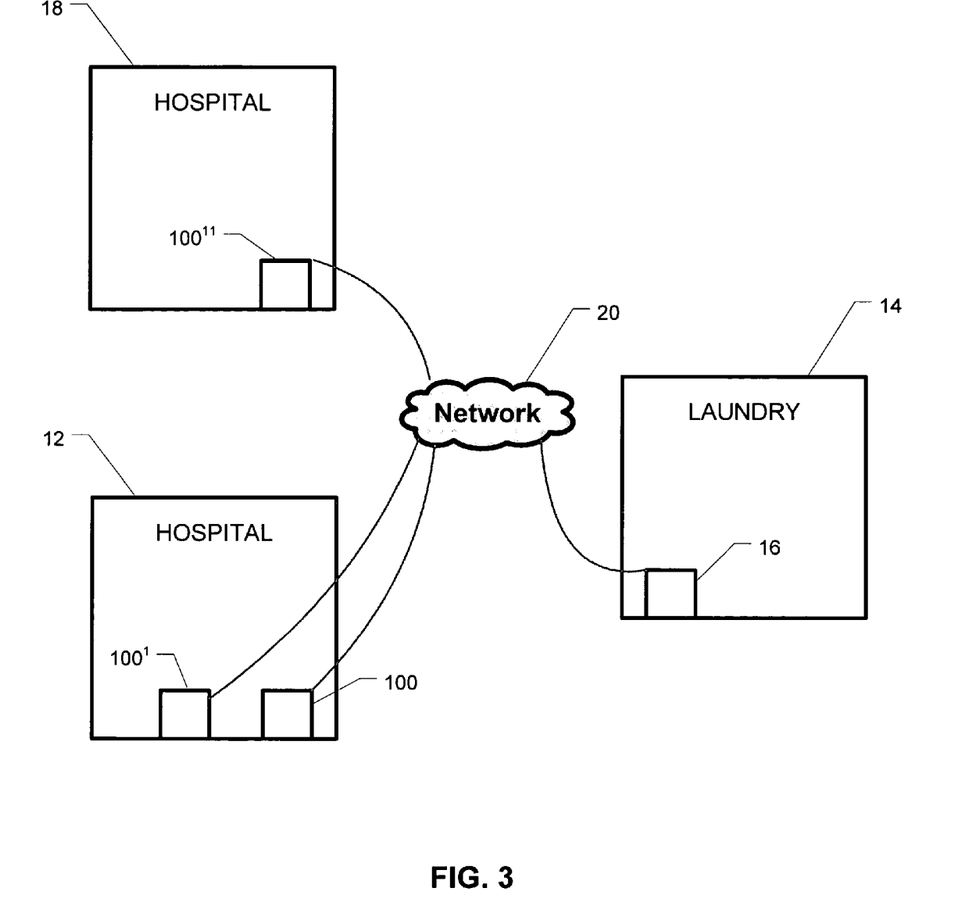
FIG. 3 is block diagram of an item management system according to yet another embodiment of the invention.

As may be understood from FIG. 3, the inventory management server 16 may be connected to communicate with dispensers 100, 100$^1$, 100$^{11}$ in multiple hospitals 12, 18, and each of these multiple hospitals 12, 18 may include multiple dispensers that are connected to communicate with the inventory management system 16. In such embodiments, the inventory management system 16 is preferably configured to use weight data from each of the dispensers 100, 100$^1$, 100$^{11}$ to which the inventory management system 16 is connected to forecast the amount of incoming dirty laundry for an upcoming time period (e.g., the next day). Accordingly, in various embodiments, a laundry service may use the system to predict the volume of laundry to be received from a plurality (e.g., 2, 3, 4, or more) of different hospitals 12, 18.

Having provided an overview of various structural and functional aspects of the system, various aspects of the item distribution system will now be described in somewhat greater detail.

System Architecture

Figure 4:
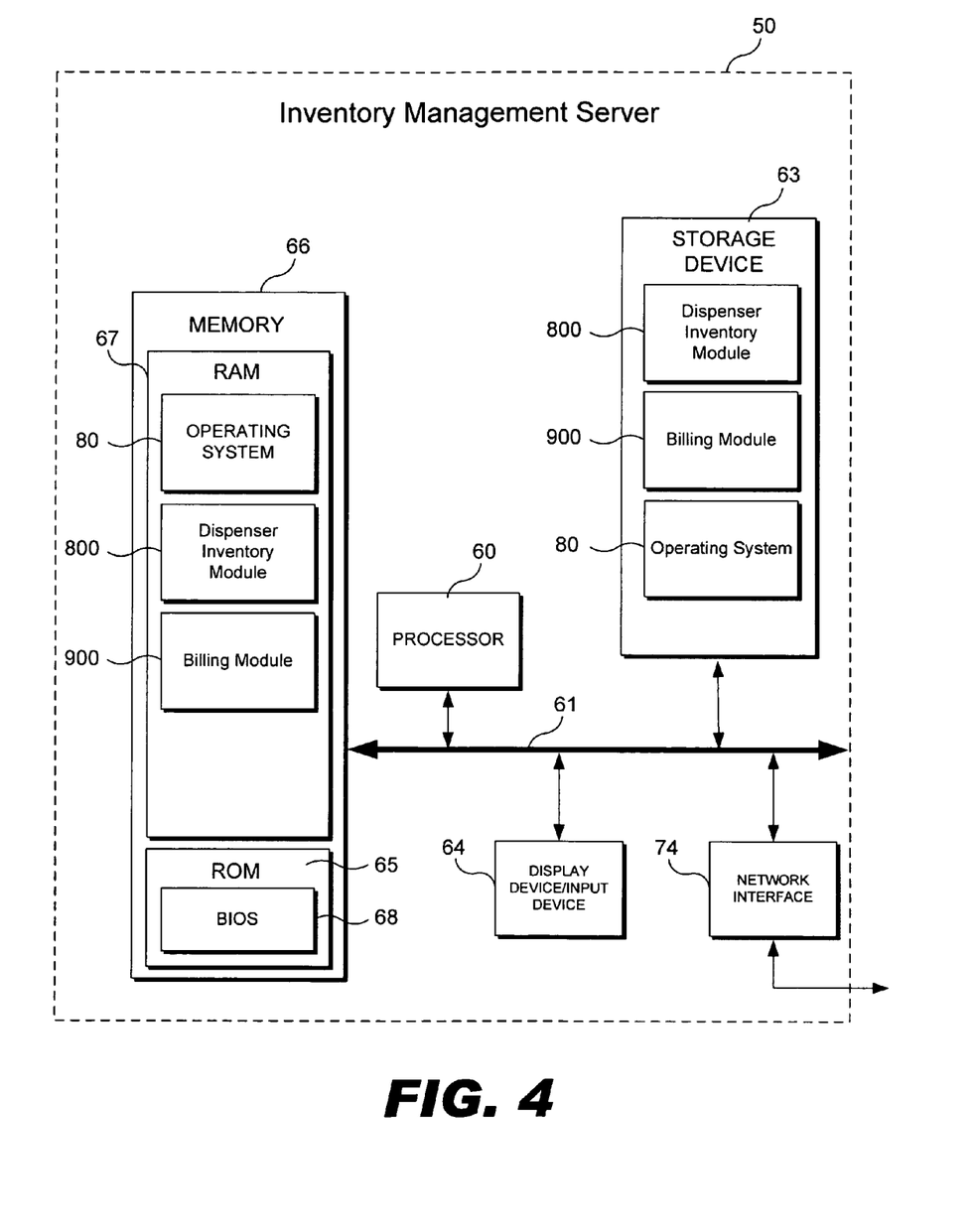
FIG. 4 is a schematic diagram of an inventory management server according to a particular embodiment of the invention.

FIG. 4 is a block diagram of an exemplary embodiment of the Inventory Management Server 50 of FIG. 4, which may, for example, comprise part of the inventory management system 16 shown in FIGS. 1-3, or an inventory management system that is remote from the laundry processing facility with which it is associated. In this embodiment, the Inventory Management Server 50 includes a processor 60 that communicates with other elements within the Inventory Management Server 50 via a system interface or bus 61. Also included in the Inventory Management Server 50 is a display device/input device 64 for receiving and displaying data. This display device/input device 64 may be, for example, a keyboard or pointing device that is used in combination with a monitor. The Inventory Management Server 50 further includes memory 66, which preferably includes both read only memory (ROM) 65 and random access memory (RAM) 67. The Inventory Management Server's ROM 65 is used to store a basic input/output system 68 (BIOS) that contains the basic routines that help to transfer information between elements within the Inventory Management Server 50.

In addition, the Inventory Management Server 50 includes one or more storage devices 63, such as a hard disk drive, a floppy disk drive, a CD Rom drive, or optical disk drive, for storing information on one or more types of computer-readable media, such as hard disks, removable magnetic disks, or CD-ROM disks. As will be understood by one of ordinary skill in this field, each of these storage devices 63 is connected to the system bus 61 via an appropriate interface. The storage devices 63 and their associated computer-readable media provide nonvolatile storage for the Inventory Management Server 50.

It should be understood that the computer-readable media described above may include any other suitable type of computer-readable media known in the art. Such media include, for example, magnetic cassettes, flash memory cards, digital video disks, and Bernoulli cartridges.

A number of program modules may be stored by the various storage devices and within the server's RAM 67. Such program modules include an operating system 80, a Dispenser Inventory Module 800, and a Billing Module 900. The Dispenser Inventory Module 800, and Billing Module 900 control certain aspects of the operation of the Inventory Management Server 50 with the assistance of the processor 60 and an operating system 80.

The Inventory Management Server 50 also includes a network interface 74 for interfacing and communicating with other elements of a computer network. It will be appreciated by one of ordinary skill in this field that one or more of the Inventory Management Server 50 components may be located geographically remotely from other Inventory Management Server 50 components. Furthermore, one or more of the server's components may be combined, and additional components for performing functions described herein may be included in the Inventory Management Server 50.

Overview of the Dispenser's General Structure

Figure 5:
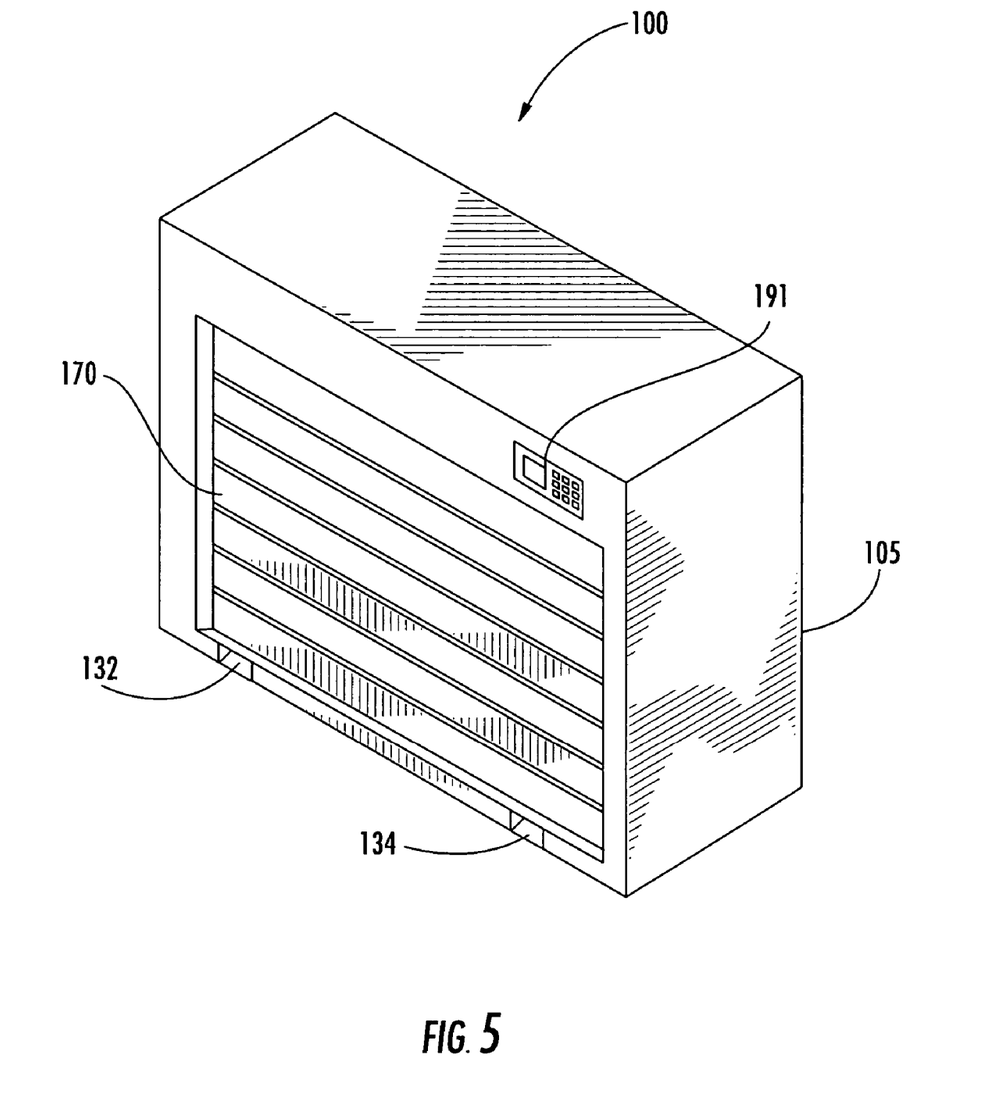
FIG. 5 is a front perspective view of a dispenser according to a particular embodiment of the invention, in which the dispenser's access door is shown in a closed position.
Figure 6A:
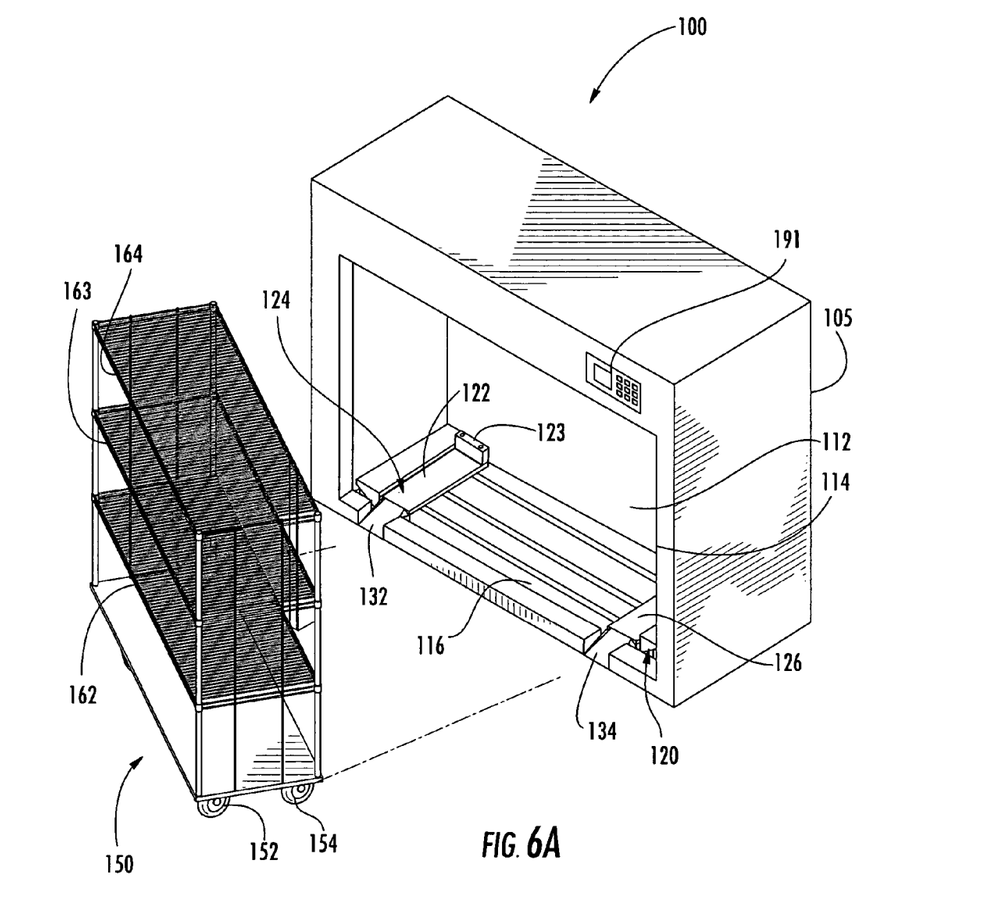
FIGS. 6A and 6B are perspective front views of the dispenser shown in FIG. 5, in which the dispenser's access door is shown in an open position.
Figure 6B:
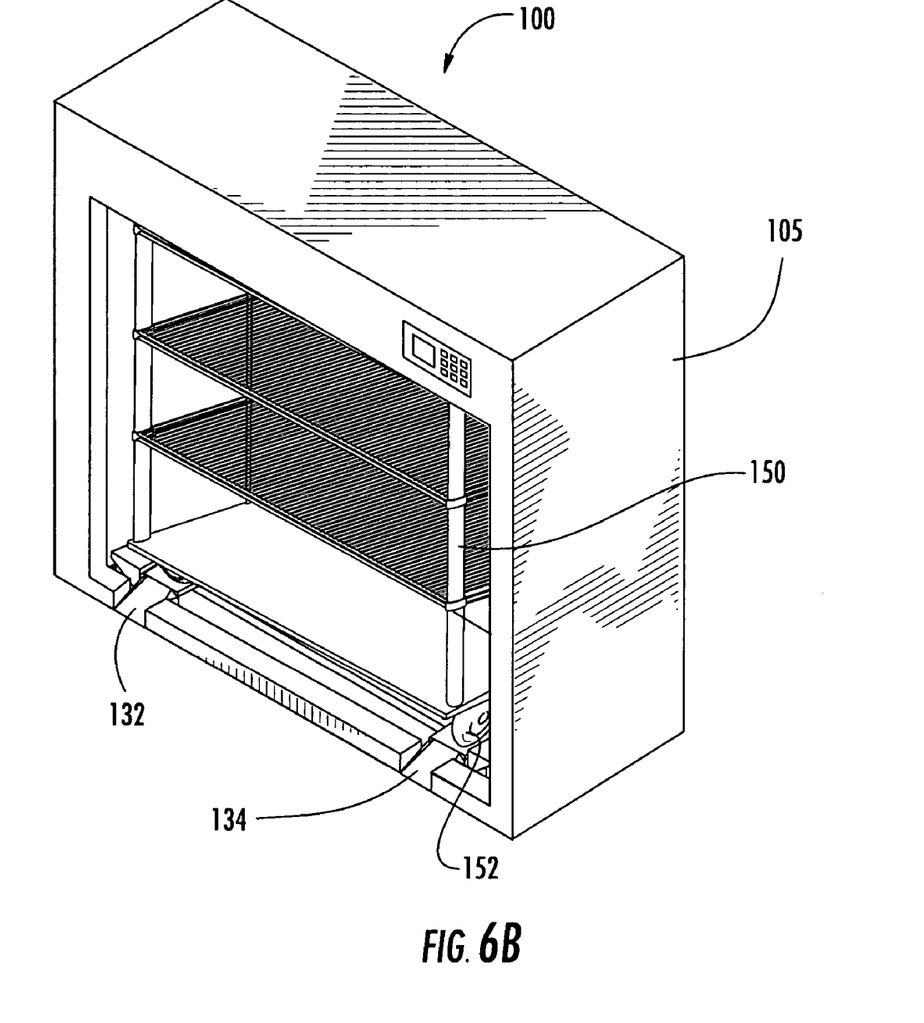
Figure 7A:
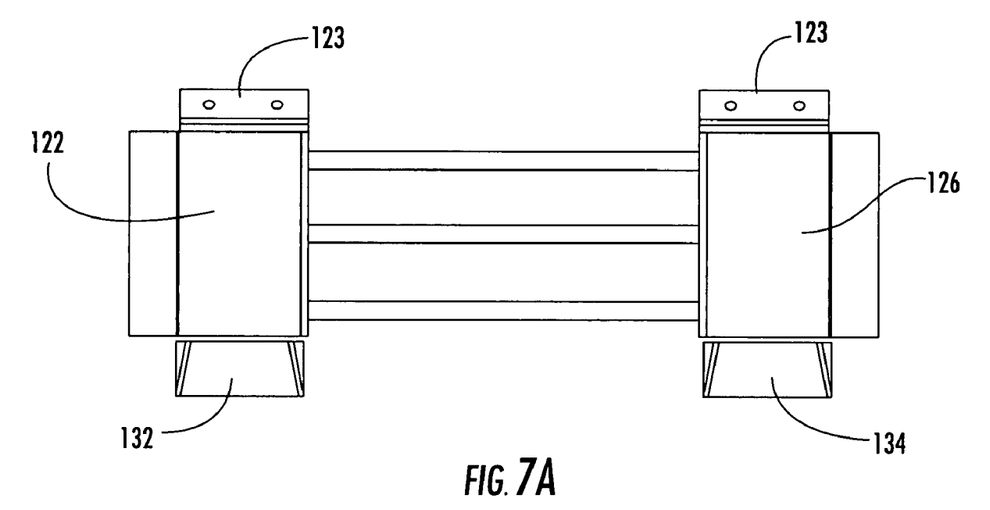
FIG. 7A is a top view of the scale assembly shown in FIGS. 5, 6A, and 6B.
Figure 7B:
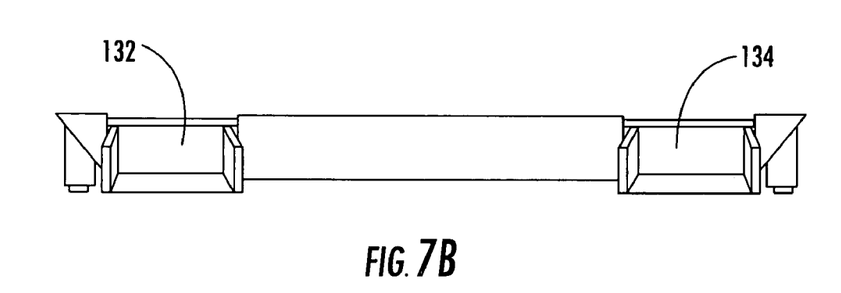
FIG. 7B is a front view of the scale assembly of FIG. 7A.

A dispenser 100 according to one embodiment of the invention is shown in FIGS. 5-7. As may be understood from these figures, in this embodiment of the invention, the dispenser 100 comprises: (1) a storage cartridge 150; and (2) one or more rolling mechanisms 152, 154 associated with (attached to) the storage cartridge 150; and (3) a dispenser housing 105. The various components of the dispenser 100 are discussed in greater detail below.

Storage Cartridge

One embodiment of the storage cartridge 150 is shown in FIGS. 6A and 6B. As may be understood from these figures, in this embodiment of the invention, the storage cartridge 150 comprises a plurality of substantially horizontal, substantially rectangular, shelves 162-164 that are spaced apart from, and substantially parallel to, each other. These shelves 162-164 may be of any appropriate shape and/or structure (e.g., spaced apart slats or solid material), and may be made of any appropriate material (e.g., metal or wood). The storage cartridge's shelves 162-164 may be supported by any appropriate support system. For example, in the embodiment shown in FIG. 6A, the storage cartridge's shelves 162-164 are supported by vertical support columns disposed adjacent the storage cartridge's respective corners.

Rolling Mechanisms

In various embodiments of the invention, the storage cartridge 150 is mounted to roll on one or more rolling mechanisms (such as wheels or rollers). For example, in the embodiment of the invention shown in FIGS. 6A and 6B, the storage cartridge 150 is mounted on four wheels 152, 154, (third and fourth wheels not shown), and each of these wheels 152, 154 is mounted adjacent a respective bottom corner of the storage cartridge 150. In various embodiments of the invention, the rolling mechanisms 152, 154 are mounted to swivel relative to the storage cartridge 150 (e.g., much like the wheels of a standard shopping cart).

Dispenser Housing

As may be understood from FIG. 5, in various embodiments of the invention, the dispenser 150 includes a dispenser housing 105 and an access door 170. These are discussed in greater detail below.

1. Dispenser Body

As may be understood from FIG. 6A, in one embodiment of the invention, the dispenser housing 105 defines both an interior portion 112, and a dispenser body access opening 114 through which the dispenser's storage cartridge 150 may be wheeled into the dispenser housing 105. In various embodiments of the invention, the dispenser body's interior portion 112 is dimensioned to receive the storage cartridge 150 substantially entirely within this interior portion 112. In various embodiments of the invention, the dispenser housing 105 further defines a floor 116 that is adapted for supporting a storage cartridge 150, such as a wheeled storage cartridge.

2. Weighing Mechanism

As may be understood from FIG. 6A, in various embodiments of the invention, the dispenser 100 comprises one or more weighing mechanisms 120 (e.g., scales) that are adapted for weighing items within the dispenser 100. As shown in FIG. 6A, in various embodiments of the invention, the dispenser 100 may include a scale 120 or other weighing mechanism, (for example, a substantially U-shaped weighing mechanism) that, for example, is positioned on and/or adjacent the dispenser's floor 116 (e.g., adjacent the upper or lower surface of the floor 116), or integrated into the dispenser's floor 116. In various embodiments of the invention, the scale 120 is dimensioned and configured so that when the dispenser's storage cartridge 150 is operably loaded into the dispenser housing 105, the storage cartridge 150 is in weighing engagement with the dispenser's scale 120.

In particular embodiments of the invention, the dispenser's scale 120 includes a weighing platform 124 (which, in the embodiment shown in FIG. 6A, includes wheel support guides 122, 126) that is positioned so that the scale's weighing surface is disposed within, or immediately adjacent, the portion of the dispenser's housing 105 that will support the dispenser's storage cartridge 150 when the dispenser's storage cartridge 150 is operatively positioned within the dispenser's housing 105. In particular embodiments of the invention, the scale's weighing surface is disposed immediately adjacent the dispenser's floor 116.

In various embodiments of the invention, such as the embodiment shown in FIG. 6A, the dispenser's scale 120 includes a weighing platform 124 that is dimensioned for supporting the storage cartridge 150 by, for example, engaging the lower surface of the storage cartridge's wheels 152, 154. For example, in the embodiment shown in FIG. 6A, the scale's weighing platform 124 includes two elongated support surfaces 122, 126 that are offset from, and parallel to each other, and that are spaced apart so that when the dispenser's cartridge 150 is in weighing engagement with the dispenser's scale 120, a first pair of the cartridge's wheels (e.g., wheels 152, 154) are supported by one of the support surfaces 122, 126, and a second pair of the storage cartridge's wheels are supported by the other of the support surfaces 122, 126. In various embodiments of the invention, a wheel stop 123 is provided adjacent the interior end of each support surface 122, 126 in order to prevent the storage cartridge 150 from striking the back interior wall of the dispenser's housing 105 when the storage cartridge 150 is loaded into the dispenser's housing 105.

It should be understood that any of a variety of suitable weighing mechanisms may be used in conjunction with the present invention. However, in one embodiment of the invention, the dispenser's scale 120 includes one or more load cells with leveling feet that are positioned (e.g., adjacent opposite lateral sides of the scale's weighing platform 124) to support the scale's weighing platform 124.

3. Ramps

In various embodiments of the invention, the dispenser 100 comprises one or more ramps 132, 134 that, for example, may be positioned adjacent (e.g., immediately adjacent) the threshold of the dispenser housing's access opening 114 (e.g., immediately adjacent a front edge of the dispenser's floor 116). For example, in the embodiment of the invention shown in FIG. 6A, the dispenser 100 includes two ramps 132, 134. In this embodiment, the first ramp 132 is positioned to guide a first pair of the cartridge's wheels onto a first of the cartridge's support surfaces (e.g., support surface 122), and the second ramp 134 is positioned to guide a second pair of the cartridge's wheels 152, 154 onto a second of the cartridge's support surfaces (e.g., support surface 126).

In various embodiments of the invention, the dispenser's ramps 132, 134 (which may be substantially in the form of a wedge) are relatively short in both the horizontal and vertical directions and are relatively gradually graded. For example, in one embodiment of the invention, each ramp 132, 134 provides an increase in elevation of less than about 2" (and preferably of between about 0.5" and 1.0") over its length, which is preferably less than 7" (and preferably of between about 2" and 5"). In various embodiments of the invention, the grade of the ramp is less than about 20 degrees and preferably between about 10 and 15 degrees.

In particular embodiments, at least one of the ramps 132, 134 includes one or more wheel guides that are adapted for preventing the wheels of the storage cartridge 150 from sliding laterally off of the ramp when the wheel is moving up the ramp 132, 134.

4. Calibration System

In various embodiments of the invention, the dispenser 100 includes one or more calibration systems for calibrating one or more of the dispenser's weighing mechanisms 120. In a particular embodiment, the dispenser 100 includes a calibration system that is configured to recalibrate a scale 120 associated with the dispenser 100 in response to the scale's weight reading being below a pre-determined value (e.g., which may, for example, be about equal to, or equal to, the combined weight of the scale's weighing platform 124 and the dispenser's storage cartridge 150). In one embodiment, when the scale's weight reading falls below about the combined weight of the scale's weighing platform 124 and the dispenser's storage cartridge 150, the calibration system assumes that the dispenser's storage cartridge 150 has been removed and therefore that the weight measured by the scale 120 should be that of the weighing platform 124 alone, which is known. In this embodiment, the calibration system calibrates the dispenser's scale 120 based on this assumption.

5. Access Door

As may be understood from FIG. 5, the dispenser's access door 170 may be, for example, a flexible door, such as those described in U.S. patent application Ser. No. 10/414,581, entitled "Reduced Friction Flexible Door", which was filed on Apr. 15, 2003, and which is hereby incorporated by reference. In certain embodiments of the invention, such as the embodiment shown in FIGS. 5, 6A, and 6B, the access door 170 is a flexible "roll-up" door that is adapted so that the leading portion of the access door 170 slides within the plane of the dispenser housing's access opening 114 as the access door 170 is opened and closed.

Alternatively, the dispenser's access door 170 may take any other suitable configuration. For example, the access door 170 may include one or more user doors, such as those described in U.S. Patent Publication No. 2005/0060938 (application Ser. No. 10/671,301), which is entitled "Automated Sliding User Doors and Door Mechanisms for a Dispenser", and which is hereby incorporated by reference.

As shown in FIGS. 5, 6A, and 6B, in the depicted embodiment of the invention, the dispenser's access door 170 is mounted to selectively restrict access to the dispenser body's interior portion 112. For example, in the embodiment shown in FIG. 5, the access door 170 is mounted adjacent the dispenser body so that the access door 170 may slide between: (1) an open position in which the access door 170 does not substantially restrict access to the interior portion 112 of the dispenser body 105; and (2) a closed position in which the access door 170 substantially restricts (and preferably prevents) access to the dispenser body's interior portion 112.

6. Control System

In various embodiments of the invention, the dispenser 100 comprises a control system (which may, for example, comprise a suitable computer processor and memory) that is adapted for receiving information from one or more weighing mechanisms 120 associated with the dispenser 100, and for transmitting this information (e.g., via a suitable network such as the Internet) to a remote server (e.g., an inventory management server 50 associated with a laundry facility).

In various embodiments of the invention, the control system is further configured for controlling access to the dispenser's contents by selectively locking/unlocking, and or opening/closing the dispenser's access door 170 in response to certain conditions being satisfied. For example, in various embodiments of the invention, the dispenser 100 is adapted to maintain the access door 170 in a closed, locked position (and thereby restrict access to the dispenser's contents) until a user inputs valid access information into the dispenser's control system (e.g., via a dispenser user interface 191, such as a keypad or card reader).

In various embodiments of the invention, the control system is configured to transmit information obtained from a user (e.g., the user's access information) to a remote server (e.g., an inventory management server 50, which is part of an inventory management system 16 that is associated with a laundry facility) along with information obtained from the dispenser's weighing mechanisms 120. As described in greater detail below, this information may include, for example, the identity of the user, an organizational entity with which the user is associated (e.g., a particular hospital department), the particular time and date that the user removed items from the dispenser 100, and/or the weight of items removed from the dispenser 100 at that particular time on that particular date. As described in greater detail below, this information may be used, for example, to track user activity and to keep track of which department should be charged for laundering the items removed from the dispenser 100.

In various embodiments of the invention, the dispenser's control system is adapted for conveying information to a user (e.g., via a message displayed on a display screen associated with the dispenser 100). For example, in one embodiment in which the dispenser 100 is used for distributing linen items, the control system may display a message regarding proper linen use. One such message may be, for example, "Do not use linen for cleaning up spills. Rather, use the rags available in the broom closet."

Operation of Various Embodiments of the Invention

The operation of various embodiments of the invention will now be described in greater detail.

Loading of Cartridge

To insert the storage cartridge 150 into the dispenser housing 105, a user first opens the dispenser's access door 170 (e.g., by swiping an appropriate maintenance access card through the dispenser's magnetic card reader) and then positions the storage cartridge 170 so that: (1) the leading pair of the storage cartridge's wheels is substantially aligned with the dispenser's first ramp 132, and (2) the trailing pair of the storage cartridge's wheels 152, 154 is substantially aligned with the dispenser's second ramp 134. (See FIG. 6A). In this position, the central axis of the storage cartridge 150 is preferably substantially parallel to the front surface of the dispenser 100. The user then pushes the storage cartridge 150 toward the dispenser 100 until: (1) one of the storage cartridge's leading pair of wheels engages the dispenser's first ramp 132, and (2) one of the storage cartridge's trailing pair of wheels engages the dispenser's second ramp 134. The user then continues pushing the storage cartridge 150 toward the dispenser's interior 112 so that the storage cartridge 150 rolls up the dispenser's ramps 132, 134, into the interior of the dispenser 100, and into weighing engagement with the dispenser's scale 120. As noted above, in one embodiment of the invention, when the dispenser's storage cartridge 150 is in weighing engagement with the dispenser's scale 120, the storage cartridge's leading wheels are supported by the scale's first support surface 122, the storage cartridge's trailing wheels are supported by the scale's second support surface 126, and the storage cartridge 150 is positioned so that substantially the entire weight of the storage cartridge 150 may be measured by the scale 120. In other embodiments of the invention, the dispenser's storage cartridge 150 may have a different structural relationship to the dispenser when the storage cartridge 150 is in weighing engagement with the dispenser's scale 120.

Operation of the Weighing Mechanism

In various embodiments of the invention, the dispenser 100 includes a weighing mechanism 120 that is adapted for weighing the storage cartridge 150 when the storage cartridge 150 is operably in place within the dispenser 100. The dispenser's weighing mechanism 120 is preferably adapted to continuously, substantially continuously, or periodically measure the weight of items on its weighing platform 124, and the dispenser's control system is configured for transmitting this weight to the system's inventory management server (e.g., substantially in real time) on a continuous, substantially continuous, or periodic basis.

Operation of the Inventory Management System

In various embodiments of the invention, the inventory management system 16 is adapted to receive transaction data from one or more (and preferably each, or substantially each) dispenser 100 with which the inventory management system 16 is adapted to communicate. In various embodiments, for each particular dispenser 100 associated with the inventory management system 16, the inventory management system 16 receives this data from the particular dispenser 100 each time a transaction is conducted using the particular dispenser 100.

For example, in one embodiment of the invention, a user may initiate a transaction with a particular dispenser 100 by swiping a magnetic access card through a card reader associated with the dispenser 100. The dispenser's control system then receives access information from the access card (e.g., the user's identification information and hospital department), and verifies that the user has authorization to access items within the dispenser 100. If the user is authorized to access items within the dispenser 100, the dispenser's control system unlocks (and/or opens), the dispenser's access door 170, which allows the user to access items from the dispenser's storage cartridge 150. The user then removes the desired items from the dispenser's storage cartridge 150 and closes the dispenser's access door 170.

In particular embodiments of the invention, the dispenser's control system records the weight measured by the dispenser's scale both: (1) in response to the user entering their access information into the dispenser 100; and (2) in response to the dispenser's access door 170 being closed. (These two weight measurements may later be used to determine the weight of the items removed during the transaction). The dispenser's control system then transmits these two weight measurements, along with the user's access information (e.g., the user's identification information and department) and/or the time and date of the transaction, to the inventory management system 16. The inventory management system 16 then stores this information in memory (e.g., in a database).

As an aside, it should be understood that there normally should be no significant difference between: (1) the weight reading that is taken when the dispenser's access door 170 is closed, and (2) the weight reading that is taken when the next user enters their access information into the dispenser 100 (e.g., to gain access to items within the dispenser 100). Accordingly, in one embodiment of the invention, the system is configured to generate an alert in response to determining that the difference between these two weight readings is above a predetermined amount (e.g., greater than 1 lb). This alert may be used to identify scale malfunctions and/or tampering with the dispenser 100. In various embodiments of the invention, this alert is issued by transmitting alert data to the inventory management system 16.

It should be understood that different methodologies may be used to determine the weight of items taken from the dispenser 100, and/or the identity of the users responsible for removing the items. For example, in one embodiment of the invention, rather than recording a weight measurement upon each card swipe and access door 170 closure as described above, the dispenser's control system may simply record a weight measurement upon each closure of the dispenser's access door 170. In such an embodiment, it would typically be assumed that any weight change that occurred between a current closing of the access door 170 and the immediately previous access door closing should be attributed to the current user removing items from the dispenser 170.

In addition, it should be understood that the item management system 5 may include one or more additional computers that are connected to communicate with the various other components of the item management system 5 (e.g., via a suitable communications network 20). For example, as noted above, in various embodiments of the invention, the inventory management system 5 may include one or more inventory management computers disposed within a particular medical facility. In particular embodiments, the inventory management computers are adapted to receive information (e.g., from one ore more of the system's various dispensers 100) regarding the weight (e.g., current weight) of inventory within at least one (and preferably each) dispenser 100 within the particular medical facility. This information may be used, for example, in determining when one or more of the dispensers 100 needs to be restocked.

In one embodiment of the invention, the inventory management system is adapted for executing a dispenser inventory module and/or a billing module (each of which may, for example, be embodied in the form of suitable computer software and/or hardware). The operation of these modules is discussed below.

Dispenser Inventory Module

In various embodiments of the invention, the dispenser inventory module 800 is adapted to use weight information obtained from the system's various dispensers 100 (and/or other information) to forecast the amount of incoming dirty laundry to be processed during a particular time period. This information may then be used by a suitable laundry management software program (or, in various embodiments, by the dispenser inventory module 800) to generate a staffing schedule for the laundry facility with which the inventory management system 16 is associated. For example, in one embodiment of the invention, the dispenser inventory module 800 is adapted to: (1) use the weight information obtained from the system's various dispensers (and/or other information) to determine the total weight of items (e.g., laundered items) that was removed from each of the dispensers 100 associated with the inventory management system 16 during a particular dispensing time period; and (2) use this determined total weight of items to forecast the amount of incoming dirty laundry to be processed during a particular laundry processing time period at a particular laundry facility (e.g., the laundry facility responsible for washing items dispensed from the system's various dispensers 100). For example, in various embodiments of the invention, if the inventory management system 16 were only associated with multiple dispensers 100 in three different medical facilities, the inventory management system would: (1) receive the weight information obtained from each of the multiple dispensers in each of the hospitals during a particular dispensing time period (this would be the total weight of items that was removed from each of the dispensers 100 associated with the inventory management system 16 during the particular dispensing time period); and (2) use this determined total weight of items to forecast the amount of incoming dirty laundry to be processed during a particular laundry processing time period (e.g., the following day) at the laundry facility responsible for washing items dispensed from the system's various dispensers.

In one embodiment of the invention, the particular "dispensing time period" for one or more (and preferably all of) the dispensers within a particular hospital is measured in respect to a scheduled time of a laundry pickup from the particular hospital. For example, this particular dispensing time period may be the 24 hour period of time (or other period of time, such as a 48 or 72 hour period of time) that ends about 3 hours (or other pre-determined period of time) before the regularly scheduled time that the laundry service that services the dispensers would pick laundry up from the particular hospital on a particular day.

As noted above, after determining how much laundry has been dispensed by each of the various dispensers 100 within a particular dispensing time period (which may vary from dispenser to dispenser—e.g., based on the time that laundry dispensed from the dispenser will be picked up to be processed by a particular laundry facility), the inventory management system 16 may then use this information to estimate the total weight of items to be received by a laundry facility associated with the inventory management system 16 during a particular, subsequent laundry processing time period (e.g., on the following day). In one embodiment of the invention, the system does this by assuming that a certain percentage of the laundry removed from each dispenser 100 during the dispenser's particular dispensing time period (e.g., about 90% or 100% of the laundry removed from the dispenser during the dispenser's particular dispensing time period) will be sent to the laundry facility for processing on the day after the particular dispensing time period ends.

For example, a particular dispensing time period for a particular time period may end at 3:00 pm on a Wednesday for all of the dispensers within a particular hospital. In this example, one embodiment of the system would forecast that, on Thursday (the next day), the laundry service would receive, from the hospital, a weight of laundry equal to 90% of the weight of laundry removed from the particular hospital's various dispensers during the "particular dispensing time period". The inventory management system 16 may repeat this process for multiple hospitals to forecast the amount of laundry to be received from each of the hospitals on a particular day. As noted above, the particular dispensing time period may vary from dispenser to dispenser, and from hospital to hospital.

Billing Module

In various embodiments of the invention, the inventory management system 16 is adapted to communicate with (and receive inventory weight information from) a plurality of dispensers 100, each of which is disposed within a different department within a particular hospital. In various embodiments of the invention, the billing module is configured to use this information to determine how much to charge each respective department for laundry processing services. For example, as discussed above, in various embodiments of the invention, the system stores information (e.g., within a database) for each transaction conducted at each dispenser 100 associated with the inventory management system 16. This transaction information may include, for example: (1) the identity of the user conducting the transaction; (2) the weight of items removed by the user during the transaction; and (3) an organizational entity (e.g., hospital department) with which the user is associated. As noted above, the weight of items removed by the user during the transaction may be determined by subtracting: (1) the weight measured by the dispenser's scale 120 at the time at which the user closed the dispenser's access door 170 to end a particular transaction, from (2) the weight measured by the dispenser's scale 120 at the time at which the user entered their access information into the particular dispenser 100 to begin a particular transaction. Alternatively, the weight of items removed by the user during the transaction may be determined by subtracting: (1) the weight measured by the dispenser's scale 120 at the time at which the user closed the dispenser's access door, from (2) the weight measured by the dispenser's scale 120 when the particular dispenser's access door 170 was closed to end the particular dispenser's immediately previous transaction (e.g., with a previous user).

In various embodiments of the invention, the inventory management system 16 may use the above information to charge a particular user's department for the processing the weight of items that the particular user removed from any dispenser 100 within the hospital (or from any dispenser within multiple hospitals). In various embodiments, this may advantageously avoid the currently common situation where a particular department is charged for laundering items that are removed from the department by an individual who is not associated with the particular department.

Also, in various embodiments of the invention, the system may be adapted to bill a department for laundry processing charges associated with a particular item in response to the item being removed from the dispenser 100. For example, in a particular embodiment, in response to determining that a user has removed a particular weight of items from the dispenser, the system would automatically charge an entity associated with the user (e.g., the user's department within a hospital) for the laundry processing charges associated with that particular weight of items.

Additional Embodiments of the Invention

It should be understood that many different types and configurations of dispensers and weighing mechanisms may be used in conjunction with the present invention. For example, in various embodiments, the dispenser includes a series of substantially fixed shelves (rather than a removable cartridge) for storing items to be dispensed from the dispenser. In such embodiments, a separate weighing mechanism may be provided for measuring the weight on each separate shelf within the dispenser (e.g., a first weighing mechanism would measure the weight of items stored on the dispenser's first shelf, a second weighing mechanism would measure the weight of items stored on the dispenser's second shelf, etc. . . . ). This may be accomplished in any appropriate manner known in the art (e.g., by providing individual load cells adjacent the structures supporting each shelf).

Figure 8:
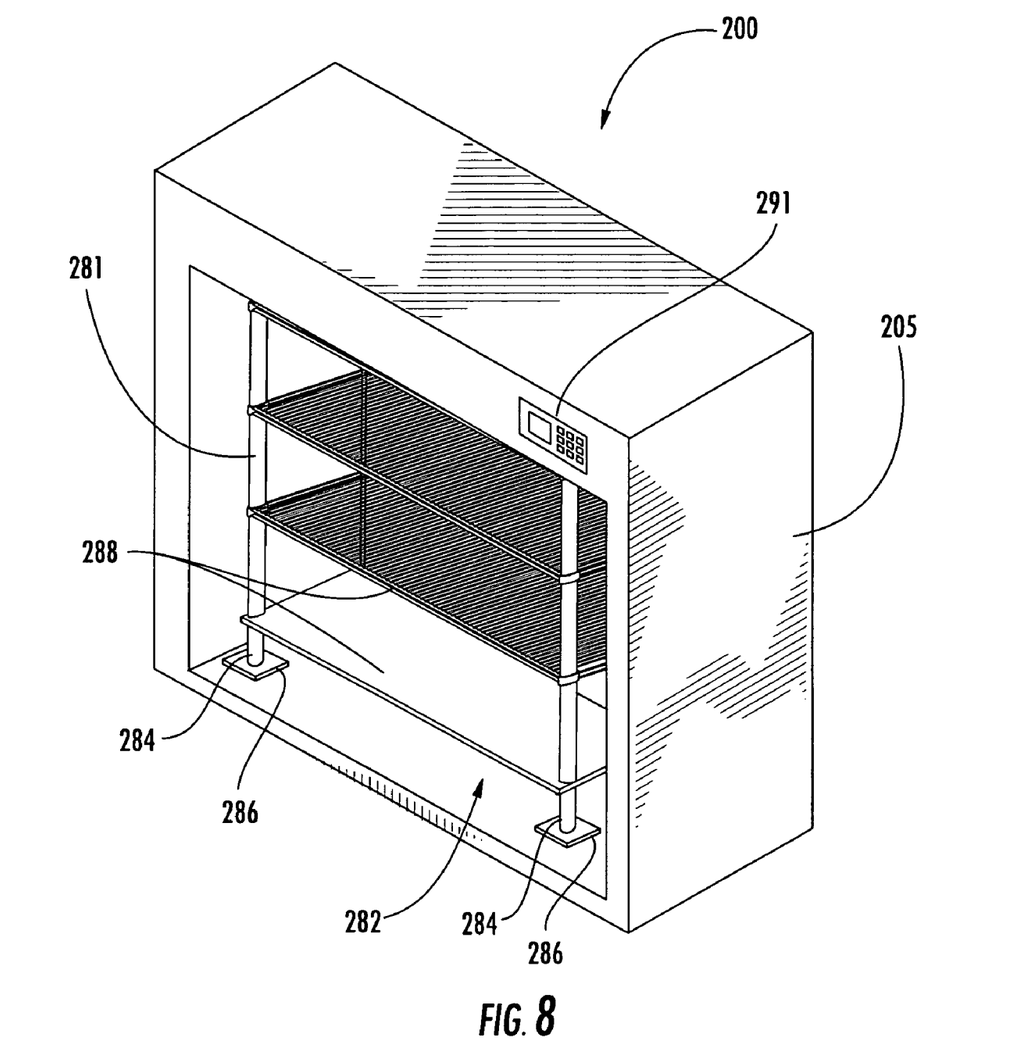
FIG. 8 is a front perspective view of a dispenser according to a further embodiment of the invention.

Alternatively a single weighing mechanism may be provided for weighing items on all of the dispenser's shelves as shown in FIG. 8. As may be understood from this figure, in one such embodiment of the invention, a shelving unit 282 (rather than a wheeled storage cartridge) is provided within the interior of the dispenser housing 205 and used to store items to be dispensed from the dispenser 200. In this embodiment, the shelving unit 282 is supported by four legs 284, and a respective load cell 286 is positioned immediately beneath each of the shelving unit's legs 284. These load cells 286 are preferably connected to transmit weight information to a processor, which uses this information to calculate the combined weight of the shelving unit 282 and any items stored on the shelving unit's shelves 288.

In yet another embodiment, a weighing mechanism is provided for weighing the entire dispenser and its contents. For example, the dispenser may rest on a scale that is configured for measuring and transmitting its current weight reading in the manner described above. In this embodiment, the total weight of the dispenser may be used to determine the weight of the dispenser's contents (e.g., by subtracting the weight of the dispenser and the weighing platform from the total weight measured by the scale). In an alternative embodiment, this scale is mounted on rolling mechanisms (e.g., so that the entire scale/dispenser assembly may be rolled from place to place).

CONCLUSION

Many modifications and other embodiments of the invention will come to mind to one skilled in the art to which this invention pertains having the benefit of the teachings presented in the foregoing descriptions and the associated drawings. For example, it should be understood that while the present invention is described in regard to managing the inventory of laundered items, the above system may be used in conjunction with other items, such as dishware, scuba tanks, disposable cameras, and other reusable consumer items. Accordingly, it is to be understood that the invention is not to be limited to the specific embodiments disclosed and that modifications and other embodiments are intended to be included within the scope of the appended exemplary concepts. Although specific terms are employed herein, they are used in a generic and descriptive sense only and not for the purposes of limitation.

What is claimed is:

1. An item distribution system comprising:
    an automated dispenser that is adapted for dispensing items from a storage cartridge that is adapted to be selectively rolled into and out of operable engagement with said automated dispenser;
    an inventory server that is adapted to receive information from said dispenser via a communications network; and
    a weighing mechanism positioned to measure a storage cartridge weight when said storage cartridge is in operable engagement with said dispenser, said storage cartridge weight comprising a weight of said storage cartridge and a weight of one or more items stored within said storage cartridge, wherein:
    said inventory server is adapted to receive said storage cartridge weight from said dispenser via said communications network;
    said automated dispenser is adapted for dispensing laundered items from said storage cartridge; and
    said item distribution system is adapted to use said storage cartridge weight to forecast the amount of dirty laundry that will be received from a medical facility with which the automated dispenser is associated.

2. The item distribution system of claim 1, wherein said weighing mechanism is disposed within said automated dispenser.

3. The item distribution system of claim 1, wherein said storage cartridge weight further comprises a weight of a weighing platform associated with said weighing mechanism.

4. An item distribution system comprising:
    a dispenser;
    an inventory management computer system;
    a weighing mechanism positioned to measure a dispenser inventory weight comprising a weight of one or more items within said dispenser, wherein:
    said inventory management computer system is adapted to receive said dispenser inventory weight; and
    said inventory management computer system is configured for:
        (A) receiving said dispenser inventory weight; and
        (B) forecasting an amount of incoming items to be processed at an item processing facility based, at least in part, on said dispenser inventory weight.

5. The item distribution system of claim 4, wherein said dispenser is adapted to transmit said dispenser inventory weight to said inventory management computer system via a communications network.

6. The item distribution system of claim 4, wherein:
said incoming items comprise dirty laundry; and
said inventory management computer system is configured for forecasting an amount of dirty laundry to be received at a laundry processing facility based, at least in part, on said dispenser inventory weight.

7. The item distribution system of claim 4, wherein said inventory management computer system is configured for generating a staffing schedule based, at least in part, on said forecasted amount of dirty laundry to be received at said laundry processing facility.

8. The item distribution system of claim 4, wherein said inventory management computer system is configured for generating a staffing schedule based, at least in part, on said dispenser inventory weight.

9. The item distribution system of claim 4, wherein:
said dispenser is a first dispenser;
said weighing mechanism is a first weighing mechanism;
said dispenser inventory weight is a first dispenser inventory weight;
said one are more items is a first set of one or more items;
said item distribution system further comprises:
  (A) a second dispenser;
  (B) a second item weighing mechanism positioned to measure a second dispenser inventory weight, said second dispenser inventory weight comprising a weight of a second set of one or more items within said second dispenser; and
said inventory management computer system is configured for:
  (A) receiving said second dispenser inventory weight; and
  (B) forecasting said amount of incoming items to be processed at said item processing facility based, at least in part, on said second dispenser inventory weight.

10. The item distribution system of claim 9, wherein:
said first dispenser is disposed within a first medical facility; and
said second dispenser is disposed within a second medical facility that is geographically remote from said first medical facility.

11. The item distribution system of claim 9, wherein:
said first dispenser and second dispensers are both disposed within a particular medical facility.

12. The item distribution system of claim 9, wherein:
said first dispenser is adapted to transmit said first dispenser inventory weight to said inventory management computer system via a communications network; and second dispenser is adapted to transmit said second dispenser inventory weight to said inventory management computer system via said communications network.

13. The item distribution system of claim 9, wherein:
said first set of one or more items comprises one or more laundered items;
said second set of one or more items comprises one or more laundered items; and
said inventory management computer system is configured for forecasting an amount of dirty laundry to be received at a laundry processing facility based, at least in part, on:
  (A) said first dispenser inventory weight; and
  (B) said second dispenser inventory weight.

14. The item distribution system of claim 9, wherein said item distribution system is configured for generating a staffing schedule based, at least in part, on said forecasted amount of dirty laundry to be received at said laundry processing facility.

15. The item distribution system of claim 9, wherein said inventory management computer system is configured for generating a staffing schedule based, at least in part, on said forecasted amount of dirty laundry to be received at said laundry processing facility.

16. A method of forecasting the amount of a particular type of items to be received by an item processing facility during a first particular period of time, said method comprising:
  (A) providing one or more automated dispensers, each particular one of which is adapted for:
    (1) dispensing said particular type of items, and
    (2) for substantially automatically tracking an amount of said particular type of items dispensed from said particular dispenser;
  (B) receiving dispenser activity information from each particular one of said automated dispensers, said dispenser activity information indicating the amount said particular type of items dispensed by said particular dispenser within a second particular period of time; and
  (C) using said dispenser activity information to forecast the amount of said particular type of items to be received by an item processing facility during said first particular period of time.

17. The method of claim 16, wherein said particular type of items is launderable items, and said item processing facility is a laundry facility.

18. The method of claim 16, further comprising, in Step (C), forecasting said amount of said particular type of items based on an assumption that said amount of said particular type of items will be about a certain percentage of a total amount of items distributed from one or more dispensers during one or more particular periods of time.

* * * * *